INVENTOR.
RUSSELL W. GRANT
BY
John F. Ohlandt Jr.
ATTORNEY

ELECTROLYTIC BATH FOR MAGNETIC DEPOSITION

Filed June 20, 1966 3 Sheets-Sheet 2

INVENTOR
RUSSELL W. GRANT
BY
John F. Ohlandt, Jr.
ATTORNEY

ELECTROLYTIC BATH FOR MAGNETIC DEPOSITION

Filed June 20, 1966 3 Sheets-Sheet 3

INVENTOR.
RUSSELL W. GRANT
BY
John F. Ohlandt Jr.
ATTORNEY

United States Patent Office 3,463,708
Patented Aug. 26, 1969

3,463,708
ELECTROLYTIC BATH FOR MAGNETIC DEPOSITION
Russell W. Grant, Boston, Mass., assignor to Mohawk Data Sciences Corporation, East Herkimer, N.Y.
Filed June 20, 1966, Ser. No. 558,659
Int. Cl. C23b 5/32
U.S. Cl. 204—43 1 Claim

ABSTRACT OF THE DISCLOSURE

An electrolytic bath for the deposition of magnetic coatings on metal substrates, particularly on aluminum discs or the like, to provide record carriers. The bath is formulated with the following composition: cobalt ion having a concentration of 25–35 grams per liter, nickel ion having a concentration of 25–35 grams per liter, sodium hypophosphite having a concentration of 0.5–2.0 grams per liter, ammonium chloride having a concentration of 25.0–55.0 grams per liter and pyrotartaric anhydried having a concentration of 5.7–11.4 grams per liter. With such a selected electrolytic bath there exists a particular range for the plating voltage which, by judicious selection can provide tremendous variation in the coercive force.

This invention relates to the electrodeposition of magnetic coatings, and more particularly, to the electroplating of magnetic coatings on a variety of substrates, typically on metal substrates. The invention is more specifically concerned with the preparation of aluminum discs or the like having magnetic coatings, which provide coercive forces in the detectable range of from less than 50 to 850 oersteds, and whose thicknesses vary from 3 mils down to less than 1 micro inch, with predictability and control of the magnetic properties therein.

Magnetically coated discs or other record carriers find wide applicability in the field of digital data recording. However, because of the precision requirements in digital data recording, very strict tolerances are imposed on the thicknesses of the magnetic coatings and on the quality of these coatings, particularly the magnetic characteristics thereof. Such magnetic characteristics include high coercivity and substantial remanence. Moreover, these coatings should have excellent physical properties such as smooth surfaces and good adherence to the base material, reproducibility, surface brightness and great hardness, as well as good resistance to corrosion.

Accordingly it is a fundamental object of the present invention to facilitate the production of high quality magnetic coatings having precisely and uniformly controlled magnetic characteristics.

In order to control with great precision the magnetic characteristics where the coating comprises an alloy such as nickel-cobalt it is essential that the proper ratio and magnetic properties of these constituents be preserved throughout the entire extent of the magnetic coating deposition so that the exact coercive force that is required and the substantial remanence associated therewith may be uniformly present in the disc or other record carrier.

Many attemps have been made in the past to meet the previously noted stringent requirements for obtaining high quality magnetically coated discs. Oxide coating techniques have been employed in this attempt and have been reasonably successful. However, such oxide coating techniques have been found to be far more expensive, produce low remanence and are more complicated than electrodeposition. Because of the recognition that electroplating could be a far less expensive technique and produce metals of higher bit densities, attempts have also been made to further this approach. Electrolessplating is subject to many vagaries as, for example, the following problems: poor adherence, non-reproducible results, poor brightness, difficult processing, variable bath conditions, high pH, disagreeable fumes, flow patterns in metal, hydrogen bubbles, varying thickness, no definition of magnetic parameters poor squareness, autodecomposition, short bath life, poor theoretical description, neglect of important parameters, heat treatment, stressed deposits and corrosive baths.

In the electroplating art different workers have proposed a correlation between the thickness of the magnetic coating and the coercive force but without any theoretical reasoning. The present invention is related to the discovery that voltage causes specific coercive forces in conjunction with the precise nature of the ionic sphere of the metal ion in solution. These factors determine the crystal structure and composition of the bimetallic deposition.

Accordingly, it is a specific object of the present invention to provide an electrolytic bath that is employable with an electroplating technique which incorporates voltage control for the production of magnetically coated discs.

The electrolytic bath of the present invention can, when slightly modified, produce a wide range of coercive force and associated energy ($B_rT$). The coatings produced have excellent squareness, which is the ratio of $B_r/B_s$, well-known to those skilled in the art, and have very slight anisotropy.

The novel electrolytic bath of the present invention is related to a discovery described in co-pending application Ser. No. 558,889, filed of even date, and assigned to the assignee of this application. It has been found that voltage is a very critically important parameter in electroplating. Different voltages cause different ratios of the constituent metals to be plated and therefore cause different crystal structures, and as a result, regularly varying coercive forces. In conjunction with a selected electrolytic bath there exists a particular range for the plating voltage which can, by judicious selection, cause tremendous variation in the coercive force. Thereafter, by maintaining the voltage at a precisely selected value the coercive force may be rigidly controlled and exactly determined.

The novel electrolytic bath contains as essential ingredients nickel and cobalt ions. In addition, pyrotartaric anhydride ($C_5H_6O_3$) is used in the solution to provide a constant pH, long term stability and consistency. Ammonium chloride may be varied over a wide range and is useful to eliminate the burning of the deposit when varying the amperage. Most importantly, sodium hypophosphite is incorporated in the electrolytic bath. It has long been recognized that sodium hypophosphite when used in both electroless and electrolytic magnetic plating baths produces typically "hard" magnetic materials suitable for recording purposes. The mechanism for this effect has not been elucidated and it is believed that the hypophosphite ion is complexed with the metal ions in the ionic atmosphere in solution such that the "proper"

ion is presented for reduction. Thus, it is the combined reducing power of both the ion and the electrons which cause the metal to be deposited into a particular crystal structure. The hypophosphite ion, in and of itself, does not cause the reduction of the metal ions which is the function of the electrons, but rather influences the ion itself to be reduced in such a manner as to produce specific coercive forces. The particular ranges for these constituents are provided hereinatter.

Other additives have been used in the electrolytic bath but it was found that they did not enhance the magnetic characteristic and only served to confuse the plating situation. Among others, monosodium phosphite and hydroxylamine hydrochloride may replace the sodium hypophosphite. Other buffers were used such as glutaric acid, glycollic acid and several others but either produced harmful effects or did not improve on the characteristics of pyrotartaric anhydride.

It should be noted with regard to the constituents of the electrolytic bath that, fundamentally, no particular plating solution is absolutely required and it could be stated that only the nickel and cobalt ions in solution are critical. However, as emphasized hereinabove, the paramount features of the present invention are derived from the knowledge gained from actual plating which enables the precise control of the important plating parameters.

It will be appreciated that from a crystal structure model of the magnetic parameters, nickel and cobalt can combine to form an infinite series of materials due solely to their additive inherent magnetic properties and interaction between each other. However, to define these would be impossible and it is by confining attention to a selected area that controls are provided over the magnetic coating to produce selectively and reproducibly the correct properties.

The novel features and the advantages of the present invention, both as to its organization and method of operation, will be best understood from the accompanying description taken in connection with the accompanying drawings, in which like characters refer to like parts, and in which.

FIG. *5a* and *5b* depict several examples of B–H loop curves for certain specimens.

Figure 1:
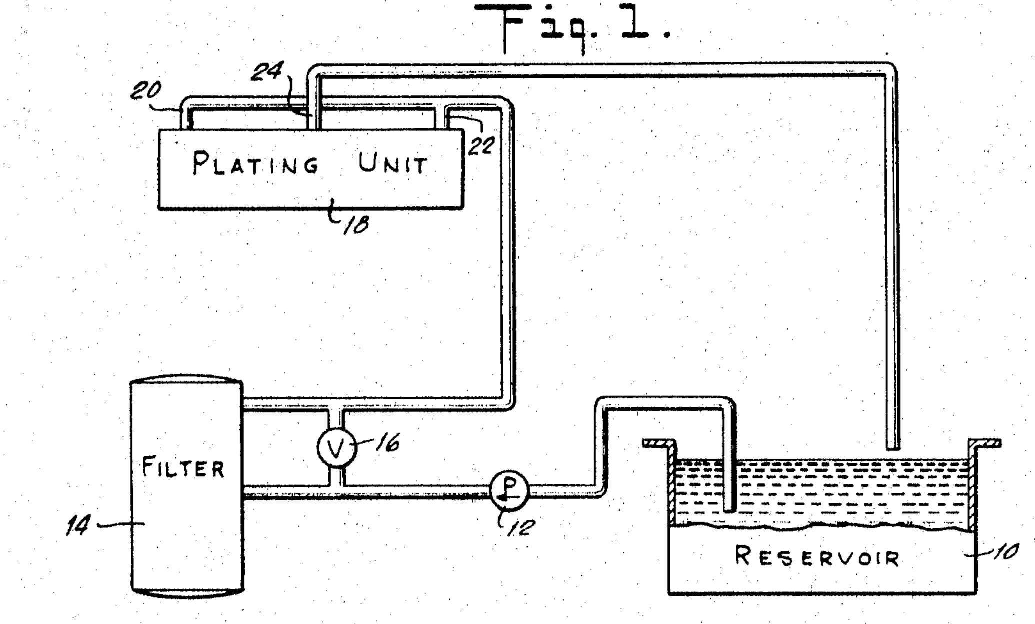
FIG. 1 is a schematic illustration of the plating system.

Referring now to the figures and particularly FIG. 1, there is shown schematically the complete system comprising a reservoir 10 in which the electrolytic solution to be used is stored. Liquid is withdrawn from the reservoir by means of the pump 12 and preferably passed through the filter 14. However, if desired, at any time the filter 14 may be bypassed by opening the valve 16 to increase the flow in the plating unit. The solution is then brought into the plating unit 18 via conduits 20 and 22 and is withdrawn therefrom via conduit 24, whence it is brought back to the reservoir 10.

Figure 2:
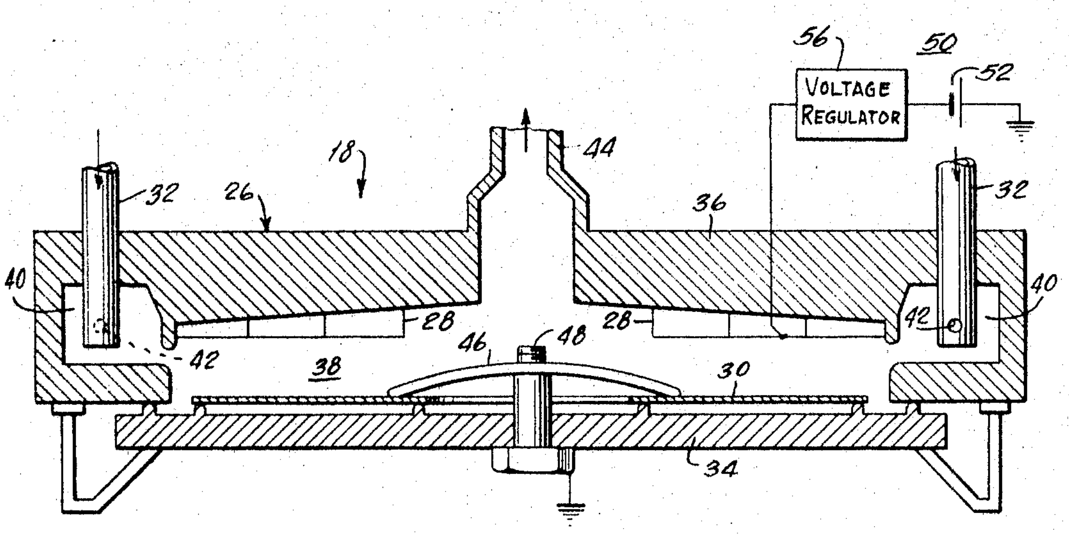
FIG. 2 is a diagrammatic view illustrating the plating unit and the electrical system.

Referring to FIG. 2, the plating system itself is an electrodeposition process whereby the amount of cations are caused to be deposited by the current flowing through the cathode/solution/anode system by a voltage regulated D.C. power supply.

The plating unit 18 consists of a tank 26, of generally cylindrical shape. Within the tank 26 anodes 28 and cathode 30 are provided. Cathode 30 corresponds to the disc, or other record carrier, or plurality thereof, on which the magnetic coating is to be deposited. Anodes 28 and the cathode 30 are held at a fixed distance in the tank. The distance between anode and cathode is not critical except that it should be held constant and the pattern of the anode should not be "thrown" onto the cathode. A distance of about $\frac{1}{21}$ inch is optimum and will provide a constant theoretical resistance.

The anodes 28 are constituted of 45 mesh 5% ruthenium platinum alloy to inhibit deleterious reactions which may poison the system or change unduly the concentration although this alloy is not essential. It is normally expected that the pH will change somewhat, but this can easily be circumvented by buffering or continuous titration. The cathode is normally a metal which is not corroded by the solution. In addition to preplated aluminum, the common materials copper, brass and nickel have been used with success. The substrate must be clean and as smooth as required for the final product, since the plating does not distort or enhance the surrface characteristics. Thickness of the conductor metal cathode is not a problem as long as there is no potential drop across the substrate, i.e. less than 0.010 volt.

The electrolytic solution is brought into the tank 26 through a series of inlet ports 32. The tank is composed of two basic units; a clamping plate 34 and a shell 36, the latter providing supports for the inlets and electrical connections. The shell 36 defines with the clamping plate 34 the main cavity or chamber 38 for containing the electrolytic solution. The shell 36 has at its periphery an annular tunnel 40 which communicates with the inlet ports 32 and through which the solution circulates. The solution enters the chamber 38 through a series of directing orifices 42. The solution is withdrawn from the tank by way of outlet port 44. The orifices 42 are so placed as to direct the flow of fluid circumferentially and to provide even distribution.

The disc 30 is held in place by a fingered contact plate 46. Electrical contact is made to the plate 46 through the center of the clamping plate 34 by means of a bolt 48. Electrical contact is made on the other side by a suitable conductor which is brought through the shell 36 to contact the anode 28.

As noted before, good agitation is essential to attain superior physical properties. In particular, it was found that when the agitation was increased the brightness and the tarnish resistance of the plating was increased. Likewise the coaxial swirled pattern enhances the squareness of the deposit in the coaxial direction. It was found that when the agitation was increased the coercive force and the remanent magnetization increased. It is a requirement that the agitation must be of constant velocity to obtain constant coercive force. In some instances fluctuations that were obtained in large surface areas were ascribed to poor agitation.

The construction of the system as depicted in FIG. 1 is preferably entirely of materials such as polyvinylchloride, polyethylene, polypropylene or polymethylmethacrylate, thereby to eliminate corrosion and to maintain purity of the solution. Of course it will be understood that the above noted materials are suggested for use but are not requirements of the present invention.

Electrical current is supplied to the plating unit 18 by a plating power supply 50, which as one example was a KEPCO voltage and current regulated power supply Model K58–50M, capable of supplying 0–8 volts and 0–50 amperes. Such plating power supply 50 is shown in the form of a battery 52, and a voltage regulator 56.

In order to aid those skilled in the art in practicing the technique of the present invention the following details for specific examples in the plating procedure and in the use of electrolytic baths will be described.

Basically, the solutions explored are given in Formula I with ranges, and the solution used primarily for measurements is given in Formula II. All chemicals were analytical grade except pyrotartaric anhydride.

Formula I

| Constituent: | Range g./l. |
|---|---|
| Cobalt ion | 0–saturation |
| Nickel ion | 0–saturation |
| Aluminum chloride | 0–saturation |
| Pyrotartaric anhydride | 0–22.8 |
| Monosodium hypophosphite.$H_2O$ | 0–10.0 |

Formula II

| | |
|---|---|
| Cobalt ion | 25.0–35.0 |
| Nickel ion | 25.0–35.0 |
| Ammonium chloride | 25.0–55.0 |
| Pyrotartatic anhydride | 5.7–11.4 |
| Monosodium hypophosphite.$H_2O$ | 0.5–2.0 |

As noted previously, one of the fundamental advantages of the technique of the present invention, and of the electrolytic baths used with the technique, is that the coercive force produced may be very easily selected and may be varied at will. This fundamental advantage flows from the fact of the unexpected relationship that obtains between the basic parameters, namely, the voltage and the concentration of the ions that are used in the electrolytic bath. This relationship is graphically shown in FIG. 3 wherein a family of curves are depicted representative of such relationship, when the hypophosphite ion concentration is varied.

Figure 3:
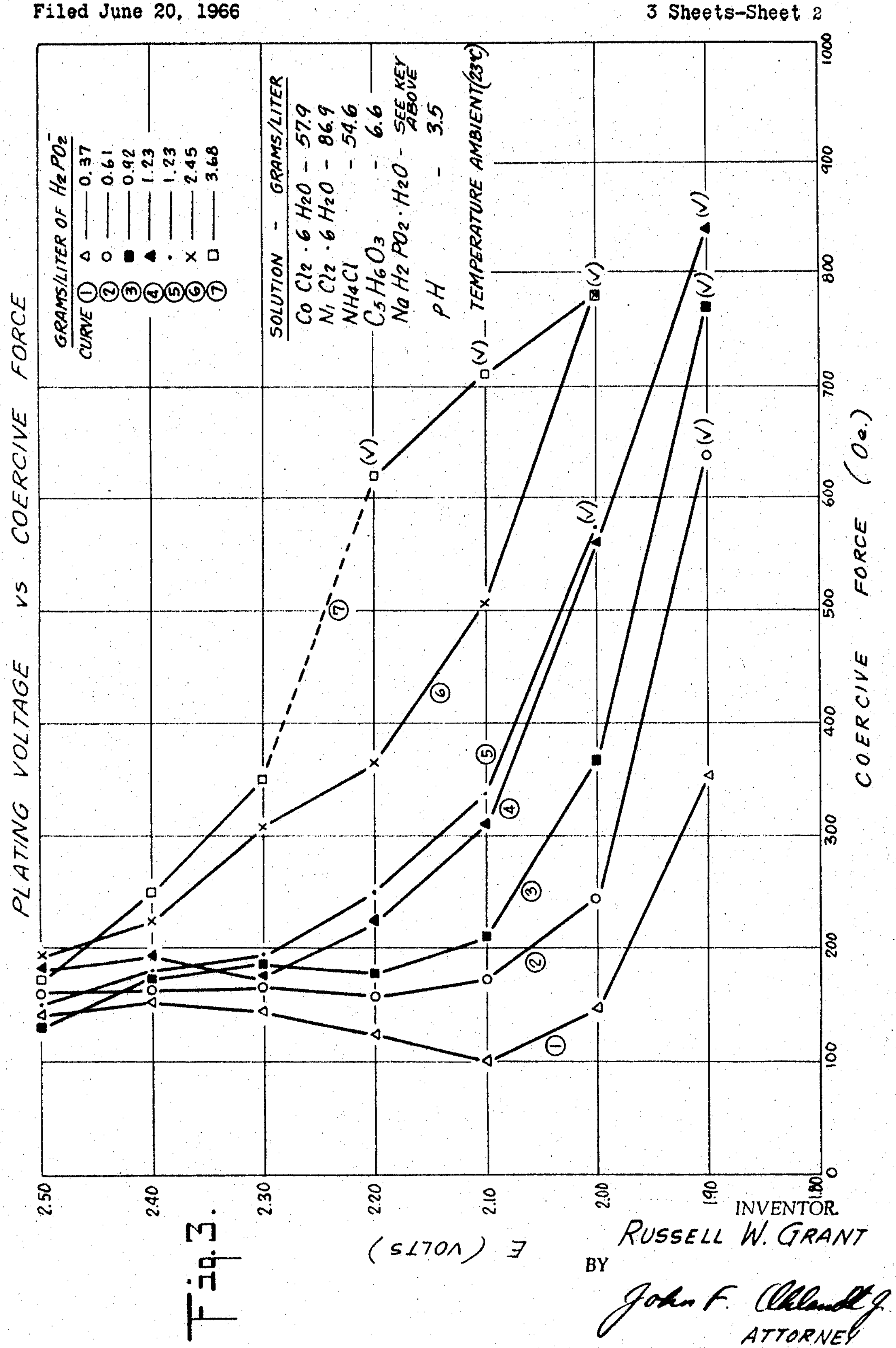
FIG. 3 is a graph depicting the variation of plating voltage versus coercive force within the critical range of interest.

Although the range for the voltages shown on the graph of FIG. 3 is between a value of 1.90 and 2.50 volts, it will be understood that the full range is between the decomposition potential and 2.50 volts. Decomposition potential is defined as the minimum voltage required to keep a steady current passing through a solution, or in other words, to cause the steady electrolysis in the solution.

For the curves illustrated in FIG. 3 the solution comprises $CoCl_2 \cdot 6H_2O$ (57.9 grams per liter), which supplies the necessary cobalt ions. The nickel ion is supplied by $NiCl_2 \cdot 6H_2O$ (86.9 grams per liter). The amounts of the other constituents, that is, $NH_4Cl$, and ($C_5H_6O_3$) are shown on the graph of FIG. 3. Hypophosphite is supplied by $NaH_2PO_2 \cdot H_2O$. The amounts of the latter vary in accordance with the key shown on the graph of FIG. 3, and are at uniquely low concentration. Thus, for each of the seven curves shown in that figure there is a corresponding value of hypophosite in grams per liter. The pH that was used was 3.5. The temperature was ambient, that is, approximately 23° C. The current densities that were used generally varied between 40–50 amps per ft.$^2$, but these values could vary, for example, from 14 to 144 amps per ft$^2$.

It should be noted that the coercive force values that were obtained for the deposited coatings were measured at 700 oersteds in a 60 cycle B–H loop tester, except for those points indicated by a checkmark on the graph of FIG. 3, which were measured at 980 oersteds. The deviations from perfectly smooth curves are due to slight changes in the testing conditions and to slight changes of the pH and in the agitation. The thickness of all the samples was approximately the same, namely 15 microinches ±50%.

From consideration of the curves of FIG. 3 several important factors emerge, one of these being that the sodium hypophosphite concentration helps to establish the correct ionic molecule from which the crystalline cobalt and/or nickel is deposited. In the technique of the present invention the sodium hypophosphite is not used to reduce the cobalt or nickel. Rather, it provides in the solution an ionic conditioner of low concentration. In general, the hypophosphite effectively defines and area relative to the other variables wherein the coercive force my be widely varied. For example, looking at FIG. 3, it will be apparent that within a critical range of voltage, in this example between 1.90 and 2.50 volts, using the basic constituents of the electrolytic solution in the proportions previously indicated, by a slight variation in the hypophosite concentration the coercive force may be changed between wide limits. To take a precise value of voltage, say 2.20 volts, and with a concentration of hypophosphite ion of approximately 2.45 grams per liter, a predictably precise value of 350 oerstad coercive force is achieved in the magnetic coating. However, at the same value of voltage, that is 2.20 volts, but with a hypophosphite concentration 36.8 grams per liter, a substantially greater coercive force having a value of 620 oersteds is produced.

Similarly it will be appreciated from the graph of FIG. 3, again by considering certain typical values of voltage such as 2.30 and 2.20, that the coercive force may be varied between the values of 250 and 620 simply by varying the voltage between the above limits under the conditions that the hypophosphite concentration is approximately 3.68 g./l. hypophosphite ion. Of course, it will be understood that these exact coercive force values, when desired, are predetermined by rigidly controlling the voltage parameter, i.e. keeping constant the selected voltage value by the aforenoted voltage regulating means, and using a specific plating solution.

It will thus be appreciated that the technique herein described enables one to produce the desired variability in the coercive force by selectively varying the voltage and/or the plating parameters. Separate operations may therefore be performed on the same or a succession of substrates, each operation for a desired deposit being separately controlled to produce the particular coercive value in the magnetic coating.

Figure 4:
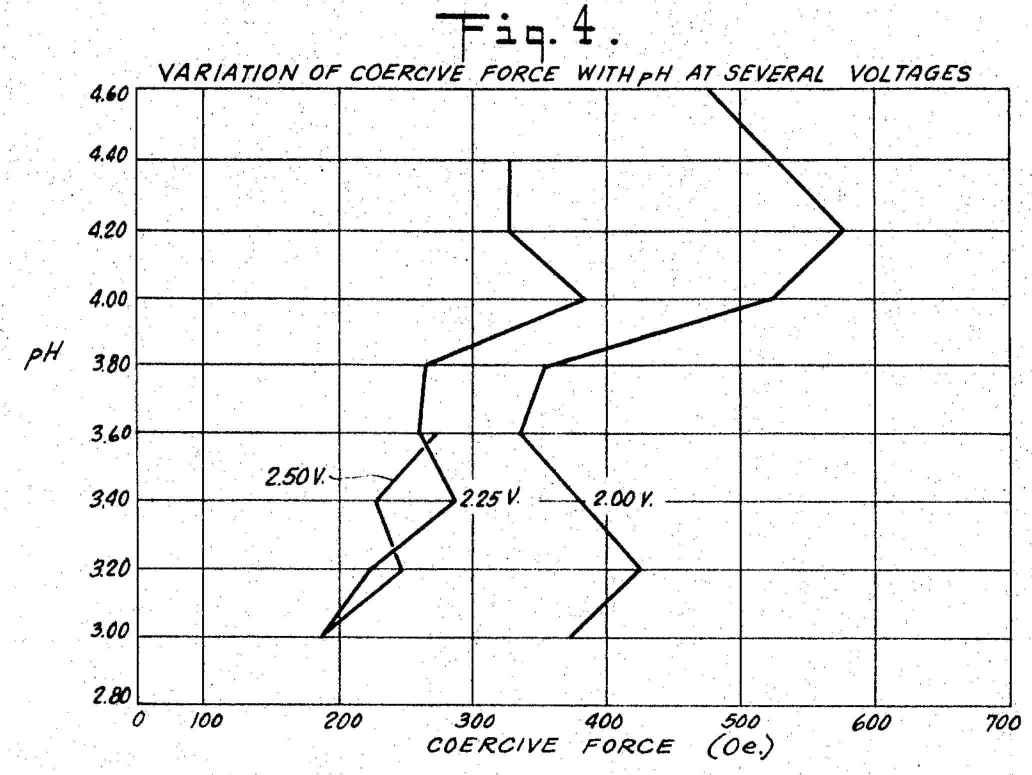
FIG. 4 is a graph depicting the variation of coercive force with pH at several voltages.

FIG. 4 illustrates the effect of coercive force with variation of pH at several selected voltages. As will be apparent from the curves the coercive force generally increases with increasing pH but is not a linear function thereof. Rather, it appears as a step function which may be justified from a ionic complex viewpoint. This variation of coercive force by pH requires that the latter be controlled to less than 0.1 pH unit although this can be relaxed or restricted as the final coercive force dictates. It is interesting to note as illustrated in the graph of FIG. 4 tha the pKa (where pKa=−log [Ka]) of the buffer lies .n the region of greatest deviation of the coercive force, giving credence to the theory that the coercive force of the metal depends on the ionic atmosphere surrounding it, since at this point there are equal amounts of pyrotartaric ion and acid. Thus, other ionic effects may occur.

Figure 5A:
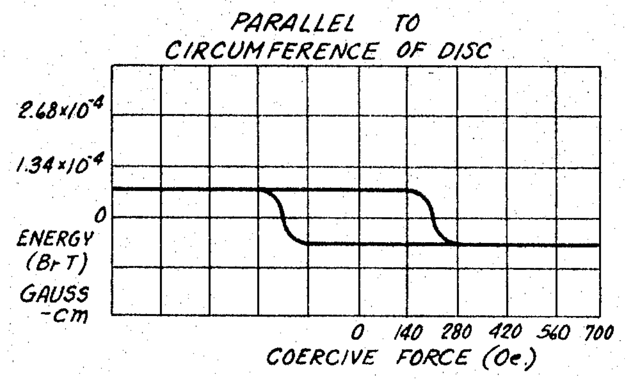
Figure 5B:
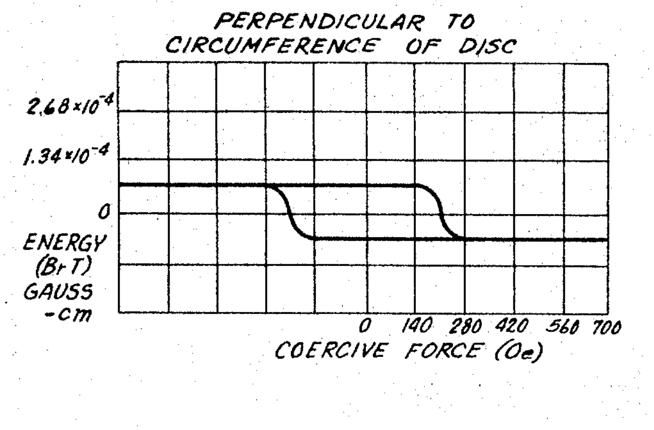

FIGURES *5a* and *5b* depict the quality of magnetic coatings that are obtainable in accordance with the technique of the present invention. In FIG. 5 the energy ($B_rT$) in gauss-centimeters is plotted against coercive force (H) in oersteds. In FIG. *5a*, the measurements were made parallel to the circumference of the disc, whereas in *5b* they were made perpendicular to the circumference of the disc. It will be appreciated that these coatings show excellent squareness.

It should be recognized that the agitation of the solution may affect the coercise force in both magnitude and anisotropy. Thus, rapid laminar agitation tends to increase the coercive force in the direction of highest solution flow and thereby producing an increase in anisotropy. Gentle laminar agitation produces better squareness and low anisotropy as exhibited in FIG. *5a* and *5b*.

Those skilled in the art will appreciate the fact that the low hypophosphite ion concentration will lead to longer bath life and less change of pH during plating.

Although voltage is used to determine the metal characteristics, the total energy of the coating is extremely important to magnetic recording. If we assume a constant residual magnetism ($B_r$) since there has been no evidence to the contrary with these groups of platings, then the energy follows simply from energy=$B_rT$ where T=thickness. We see here that the energy then varies with thickness and this may be controlled by integration of the amperage and the time of plating.

What is claimed is:

1. An aqueous acidic electrolyte for electrodepositing magnetic coatings composed of cobalt-nickel alloys comprising the combination of cobalt ion having a concentration of 25–35 grams per liter, nickel ion having a concentration of 25–35 grams per liter, sodium hypophosphite having a concentration of 0.5–2.0 grams per liter, ammonium chloride having a concentration of 25.0–55.0 grams per liter and pyrotartaric anhydride having a concentration of 5.7–11.4 grams per liter.

References Cited

UNITED STATES PATENTS

| | | | |
|---|---|---|---|
| 2,643,221 | 6/1953 | Brenner et al. | 204—43 |
| 2,644,787 | 7/1953 | Bonn et al. | 204—43 |
| 3,227,635 | 1/1966 | Koretzky et al. | 204—43 XR |

JOHN H. MACH, Primary Examiner

G. L. KAPLAN, Assistant Examiner